United States Patent
Burns

(10) Patent No.: US 12,161,260 B2
(45) Date of Patent: Dec. 10, 2024

(54) BAKING TRAY ASSEMBLY

(71) Applicant: Catherine B. Burns, Oak Park, IL (US)

(72) Inventor: Catherine B. Burns, Oak Park, IL (US)

(*) Notice: Subject to any disclaimer, the term of this patent is extended or adjusted under 35 U.S.C. 154(b) by 437 days.

(21) Appl. No.: 17/576,392

(22) Filed: Jan. 14, 2022

(65) Prior Publication Data
US 2022/0218149 A1  Jul. 14, 2022

Related U.S. Application Data

(60) Provisional application No. 63/137,310, filed on Jan. 14, 2021.

(51) Int. Cl.
    *A47J 37/01* (2006.01)
    *A47J 36/08* (2006.01)
    *A47J 36/14* (2006.01)

(52) U.S. Cl.
    CPC ............ *A47J 37/01* (2013.01); *A47J 36/08* (2013.01); *A47J 36/14* (2013.01)

(58) Field of Classification Search
    CPC ............ A47J 37/01; A47J 36/08; A47J 36/14
    USPC .......................................................... 99/444
    See application file for complete search history.

(56) References Cited

U.S. PATENT DOCUMENTS

| | | | |
|---|---|---|---|
| 30,046 A * | 9/1860 | Buckins | A47J 36/08 210/466 |
| 85,827 A * | 1/1869 | Holmes | A47J 36/08 210/245 |
| 87,904 A * | 3/1869 | Bingham | A47J 36/08 210/466 |
| 110,148 A * | 12/1870 | Leach | A47J 36/08 210/469 |
| 118,896 A * | 9/1871 | Barker | A47J 36/08 210/245 |
| 123,261 A * | 1/1872 | Johnson | A47J 36/08 210/466 |
| 405,216 A * | 6/1889 | Kendrick | A47J 36/08 210/474 |
| 419,520 A * | 1/1890 | Hauck, Jr. | A47J 36/08 210/469 |
| 434,452 A * | 8/1890 | Matthews | A47J 36/08 210/465 |
| 527,252 A * | 10/1894 | Stroud | A47J 27/04 126/369 |

(Continued)

*Primary Examiner* — Jimmy Chou
(74) *Attorney, Agent, or Firm* — Boudwin Intellectual Property Law; Daniel Boudwin

(57) ABSTRACT

A baking tray assembly includes a tray having a base, a perimeter wall extending upwardly from the base, and an open upper end defining an interior volume. A splatter guard is removably securable to the tray, wherein the splatter guard is configured to cover the open upper end of the tray when secured thereto. At least one pour spout projects upwardly from the perimeter wall of the tray, such that a tip of the pour spout is positioned above an upper edge of the perimeter wall. The splatter guard may include small cut-outs that define a pour spout opening for excess liquid to flow to the pour spout from the interior volume of the tray even when the splatter guard is secured to the tray. The baking tray assembly may include multiple pour spouts to easily drain excess liquids from the tray as needed.

5 Claims, 3 Drawing Sheets

(56) References Cited

U.S. PATENT DOCUMENTS

| | | | | |
|---|---|---|---|---|
| 534,138 A * | 2/1895 | Cleary | A47J 36/38 | 99/347 |
| 554,048 A * | 2/1896 | Bolus | A47J 36/08 | 220/759 |
| 601,589 A * | 3/1898 | Rochat | A47J 36/08 | 210/469 |
| 629,127 A * | 7/1899 | Geer | A47J 37/0694 | 99/402 |
| 665,343 A * | 1/1901 | Pfeil | A47J 36/08 | 210/469 |
| 781,081 A * | 1/1905 | MacFate | B65D 81/3222 | 99/422 |
| 1,017,183 A * | 2/1912 | Spencer | A47J 36/08 | 210/245 |
| 1,053,780 A * | 2/1913 | Brooks | A47J 36/08 | 210/469 |
| 1,166,475 A * | 1/1916 | Paquette | B65D 51/242 | 220/759 |
| 1,183,468 A * | 5/1916 | Knight | A47J 36/08 | 210/469 |
| 1,209,026 A * | 12/1916 | Pritchard | A47J 36/08 | 210/469 |
| 1,210,301 A * | 12/1916 | Galletta | A47J 36/08 | 210/245 |
| 1,214,800 A * | 2/1917 | Link | A47J 36/08 | 210/469 |
| 1,215,929 A * | 2/1917 | Guth | A47J 36/08 | 222/557 |
| 1,225,047 A * | 5/1917 | Milligan | A47J 36/08 | 210/469 |
| 1,235,625 A * | 8/1917 | Wineman | A47J 36/08 | 210/245 |
| 1,317,066 A * | 9/1919 | Bebb | A47J 36/08 | 210/469 |
| 1,569,544 A * | 1/1926 | Jamison | A47J 37/1295 | 99/413 |
| 1,578,466 A * | 3/1926 | Herman | A47J 36/08 | 210/245 |
| 1,624,276 A * | 4/1927 | Christy | A01J 1/00 | 210/474 |
| 1,624,745 A * | 4/1927 | Kuhnast | A47J 36/08 | 99/422 |
| 1,636,240 A * | 7/1927 | Partridge | A47J 36/08 | 210/465 |
| 1,750,158 A * | 3/1930 | Blakeman | A47J 36/08 | 210/465 |
| 1,770,997 A * | 7/1930 | Schmitt | A47J 36/08 | 220/324 |
| 1,781,995 A * | 11/1930 | Alexander | A47J 36/08 | 210/469 |
| 1,875,303 A * | 8/1932 | Bird | A47J 36/08 | 210/245 |
| 1,889,218 A * | 11/1932 | Reedy | F24C 15/14 | 312/246 |
| 1,897,304 A * | 2/1933 | Davis | A47J 36/08 | 220/478 |
| 1,916,710 A * | 7/1933 | Alexander | A47J 36/08 | 210/469 |
| 2,397,163 A * | 3/1946 | Serkes | A47J 36/08 | 210/469 |
| 2,397,176 A * | 3/1946 | Whiting | A47J 36/08 | 210/466 |
| 2,398,978 A * | 4/1946 | Udell | A47J 36/08 | 210/469 |
| 2,400,642 A * | 5/1946 | Hassel | A47J 36/08 | 210/469 |
| 2,415,613 A * | 2/1947 | Sulak | A47J 36/064 | 99/347 |
| 2,463,209 A * | 3/1949 | Serkes | A47J 36/08 | 210/469 |
| 2,466,347 A * | 4/1949 | Ziemianin | A47J 36/08 | 210/465 |
| 2,770,389 A * | 11/1956 | Drakoff | A47J 36/064 | 99/341 |
| 2,848,938 A * | 8/1958 | Klein | A47J 37/1295 | 222/129 |
| 2,903,229 A * | 9/1959 | Lange | A47J 45/00 | 248/688 |
| 3,065,855 A * | 11/1962 | Edwards | A47J 36/08 | 210/465 |
| 3,240,348 A * | 3/1966 | Serio | A47J 36/08 | 210/469 |
| 3,289,849 A * | 12/1966 | Livingston | A47J 36/08 | 210/474 |
| 3,301,404 A * | 1/1967 | Becker | A47J 36/08 | 210/465 |
| 3,380,376 A * | 4/1968 | Preis | A47J 37/1209 | 99/413 |
| 3,714,394 A * | 1/1973 | Evans | F24C 7/10 | 219/403 |
| 3,972,318 A * | 8/1976 | Lenoir | A47J 37/10 | D7/354 |
| 4,220,534 A * | 9/1980 | Perry | A47J 36/08 | 210/232 |
| 4,291,616 A * | 9/1981 | Taylor | A47J 37/108 | D7/355 |
| 4,310,418 A * | 1/1982 | Busbey | A47J 36/08 | 210/467 |
| 4,403,711 A * | 9/1983 | Kyosuke | A47J 36/064 | 126/299 C |
| 4,422,441 A | 12/1983 | Schoepe | | |
| 4,747,392 A * | 5/1988 | Rogers | F24C 15/12 | 220/372 |
| 4,873,918 A * | 10/1989 | Goldman | A47J 36/14 | 126/388.1 |
| D313,727 S * | 1/1991 | Gamez | D7/359 | |
| 5,012,071 A * | 4/1991 | Henke | A47J 36/38 | 219/400 |
| 5,035,800 A * | 7/1991 | Kopach | B01D 29/085 | 210/474 |
| 5,078,872 A * | 1/1992 | Durant | B01D 29/085 | 222/569 |
| D330,314 S * | 10/1992 | Ruth | D7/332 | |
| 5,178,761 A * | 1/1993 | Mohun | A47J 36/08 | 126/369 |
| D347,964 S * | 6/1994 | Davis | D7/354 | |
| 5,365,834 A * | 11/1994 | Sidoti | A47J 37/108 | 99/450 |
| D361,468 S * | 8/1995 | Wilkes | D7/361 | |
| D365,495 S * | 12/1995 | O'Higgins | D7/354 | |
| 5,653,881 A * | 8/1997 | Bruss | A47J 36/08 | 99/410 |
| D386,940 S * | 12/1997 | Hess | 210/467 | |
| 5,730,045 A * | 3/1998 | Delaquis | A47J 36/08 | 99/410 |
| D395,548 S * | 6/1998 | Morissette | D3/307 | |
| D420,848 S * | 2/2000 | Neidigh | D7/360 | |
| 6,092,670 A * | 7/2000 | Marriott | A47J 45/10 | 99/413 |
| 6,371,012 B2 * | 4/2002 | Sawyer | A21B 3/155 | 99/426 |
| D472,423 S * | 4/2003 | Swinford | D7/359 | |
| 6,668,708 B1 * | 12/2003 | Swinford | A47J 37/0694 | 99/449 |
| 6,672,204 B2 * | 1/2004 | Fiorello | A47J 36/08 | 99/506 |
| 6,789,683 B1 * | 9/2004 | Fisher | A47J 36/08 | 99/413 |
| D529,755 S * | 10/2006 | Lobman | D7/354 | |
| D562,589 S * | 2/2008 | Mellon | D6/675 | |
| D600,497 S * | 9/2009 | Ek | D7/361 | |
| D609,961 S * | 2/2010 | Bodum | D7/354 | |
| 7,878,110 B1 * | 2/2011 | Michnik | A47J 36/14 | 99/410 |
| D638,247 S * | 5/2011 | Yamada | D7/321 | |
| D664,004 S * | 7/2012 | Benishai | D7/667 | |
| 8,820,222 B2 * | 9/2014 | Cloutier | A47J 36/16 | 99/425 |

(56) References Cited

U.S. PATENT DOCUMENTS

| | | | |
|---|---|---|---|
| 8,869,682 B2 * | 10/2014 | Tosdale | A47J 27/16 99/426 |
| 8,887,943 B1 * | 11/2014 | Miller | A47G 19/02 220/573.1 |
| D751,332 S * | 3/2016 | Li | D7/354 |
| D754,470 S * | 4/2016 | Rothfield | D7/392.1 |
| 9,510,699 B1 * | 12/2016 | Miller | A47G 23/0633 |
| D786,009 S * | 5/2017 | Mirchandani | D7/354 |
| D788,578 S * | 6/2017 | Zhang | D9/425 |
| 9,784,302 B2 | 10/2017 | Reiner | |
| D805,843 S * | 12/2017 | Mirchandani | D7/354 |
| D812,413 S * | 3/2018 | Mirchandani | D7/354 |
| D829,487 S * | 10/2018 | Mirchandani | D7/354 |
| D830,112 S * | 10/2018 | Mirchandani | D7/354 |
| 10,512,355 B2 * | 12/2019 | Davison | A47J 19/00 |
| 10,561,279 B2 * | 2/2020 | Monk | A47J 43/287 |
| 10,716,421 B1 * | 7/2020 | Miller | A47G 23/04 |
| D1,014,199 S * | 2/2024 | Zhou | D7/667 |
| 2004/0250690 A1 * | 12/2004 | Restis | A47J 36/14 99/403 |
| 2005/0252814 A1 * | 11/2005 | Lobman | A47J 27/17 206/518 |
| 2007/0227965 A1 * | 10/2007 | Simard | A47J 36/14 210/469 |
| 2009/0120965 A1 * | 5/2009 | Archer, Jr. | B65D 25/40 222/569 |
| 2011/0272339 A1 * | 11/2011 | Greiner | A47J 36/08 210/232 |
| 2013/0025469 A1 * | 1/2013 | Cloutier | A47J 36/064 99/352 |
| 2013/0139707 A1 * | 6/2013 | Walling, III | A47J 36/22 99/444 |
| 2014/0042106 A1 * | 2/2014 | Davison | A47J 19/00 210/473 |
| 2014/0042170 A1 * | 2/2014 | Correa | A47J 27/04 220/573.1 |
| 2015/0208860 A1 * | 7/2015 | Parr | A47J 36/10 220/573.1 |
| 2016/0353793 A1 * | 12/2016 | Montoya | B08B 9/08 |

* cited by examiner

BAKING TRAY ASSEMBLY

CROSS-REFERENCE TO RELATED APPLICATIONS

This application claims the benefit of U.S. Provisional Application No. 63/137,310 filed on Jan. 14, 2021. The above identified patent application is herein incorporated by reference in its entirety to provide continuity of disclosure.

BACKGROUND OF THE INVENTION

The present invention relates to a baking tray assembly. More specifically, the present invention provides a baking tray assembly that includes a tray with a removably attached splatter guard, wherein the tray includes pour spouts that allow individuals to drain excess liquids from the tray even when the splatter guard is attached.

Cooking vessels such as baking dishes can be utilized to prepare a wide variety of foods. When cooking on the stovetop or within the oven, some foods tend to "splatter" and send material outward from the cooking vessel to the surrounding area. For example, when foods are cooked in oil, the moisture in the food can turn to steam, which rapidly expands outwardly and causes the oil to be splattered in the surrounding area. An example of such a food is bacon, but any food cooked in oil may result in unwanted splattering. In addition to creating a mess that can be difficult and time consuming to clean, oil and food debris splattering close to an open flame can be a dangerous fire hazard. The individual preparing the food can also be contacted by the hot oil and food debris as it splatters out of the cooking vessel, which may cause painful burns.

One solution to the splattering is to cover the cooking vessel with some object. Some cooking vessels may include a solid lid. This retains splattered oil and food debris within the interior volume of the cooking vessel. However, the solid lid also retains moisture, because the evaporating water from the food condenses back to liquid water on the cooler surface of the solid lid, and drips back into the cooked food. This may cause unwanted reactions to the cooking food, such as making it too moist to properly fry in oil, for example.

Other solutions include using a mesh-type screen as a lid for the cooking vessel, which blocks oil and food debris but allows water vapor to escape, thereby alleviating the issue of unwanted moisture buildup. However, the mesh screen typically obscures the entire cooking vessel, making it impossible to remove material from the cooking vessel without removing the mesh screen. For example, bacon and similar foods release fat as they continue to cook, and it may be desirable to drain off any unwanted or excess fat. An individual must first remove a typical mesh screen before doing so, which can result in the individual being burned if the screen is too hot. The temporary removal of the screen also reintroduces the issue of splattering oil and food material, which even if for a limited time can cause a burn and fire hazard. In order to address these concerns, the present invention provides a baking tray assembly that includes a cooking tray with a removably attached splatter-guard, whereby the structures of the tray and splatter-guard allow excess liquids to be drained from the tray even when the splatter-guard is still attached to the tray.

In light of the devices disclosed in the known art, it is submitted that the present invention substantially diverges in design elements from the known art and consequently it is clear that there is a need in the art for an improvement to cooking vessels and splatter-guards, particularly with regard to the above-described need for a cooking vessel that can be drained of excess material even with the splatter-guard secured thereto. In this regard the present invention substantially fulfills these needs.

SUMMARY OF THE INVENTION

The present invention provides a baking tray assembly wherein the same can be utilized for effectively and safely supporting a splatter guard on a cooking vessel such that the cooking vessel can be drained of excess liquid without removal of the splatter guard. In general, the baking tray assembly includes a tray having a base, a perimeter wall extending upwardly from the base, and an open upper end defining an interior volume. A splatter guard is removably securable to the tray, wherein the splatter guard is configured to cover the open upper end of the tray when secured thereto. At least one pour spout projects upwardly from the perimeter wall of the tray, such that a tip of the pour spout is positioned above an upper edge of the perimeter wall. The pour spout allows individuals to pour excess material out of the tray. The splatter guard may include small cutouts that define the pour spout openings, such that liquid can be effectively drained even while the splatter-guard covers and attaches to the tray.

In an exemplary embodiment, the present invention includes a sheet tray. The sheet tray comprises a base, an internal rack, and a mesh cover. The base further comprises a plurality of sidewalls extending upward therefrom. The internal rack is removably disposed within the sheet tray. Food may be placed directly onto the internal rack. The mesh cover is slidably engageable with the sheet tray, such that the cover may slide over the entire sheet tray. In some embodiments, the cover is composed from a fine mesh or densely wired material. At least one drain spigot or pour spout is disposed on the corner of the sheet tray to drain an accumulated grease from the sheet tray after food items are cooked therein.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
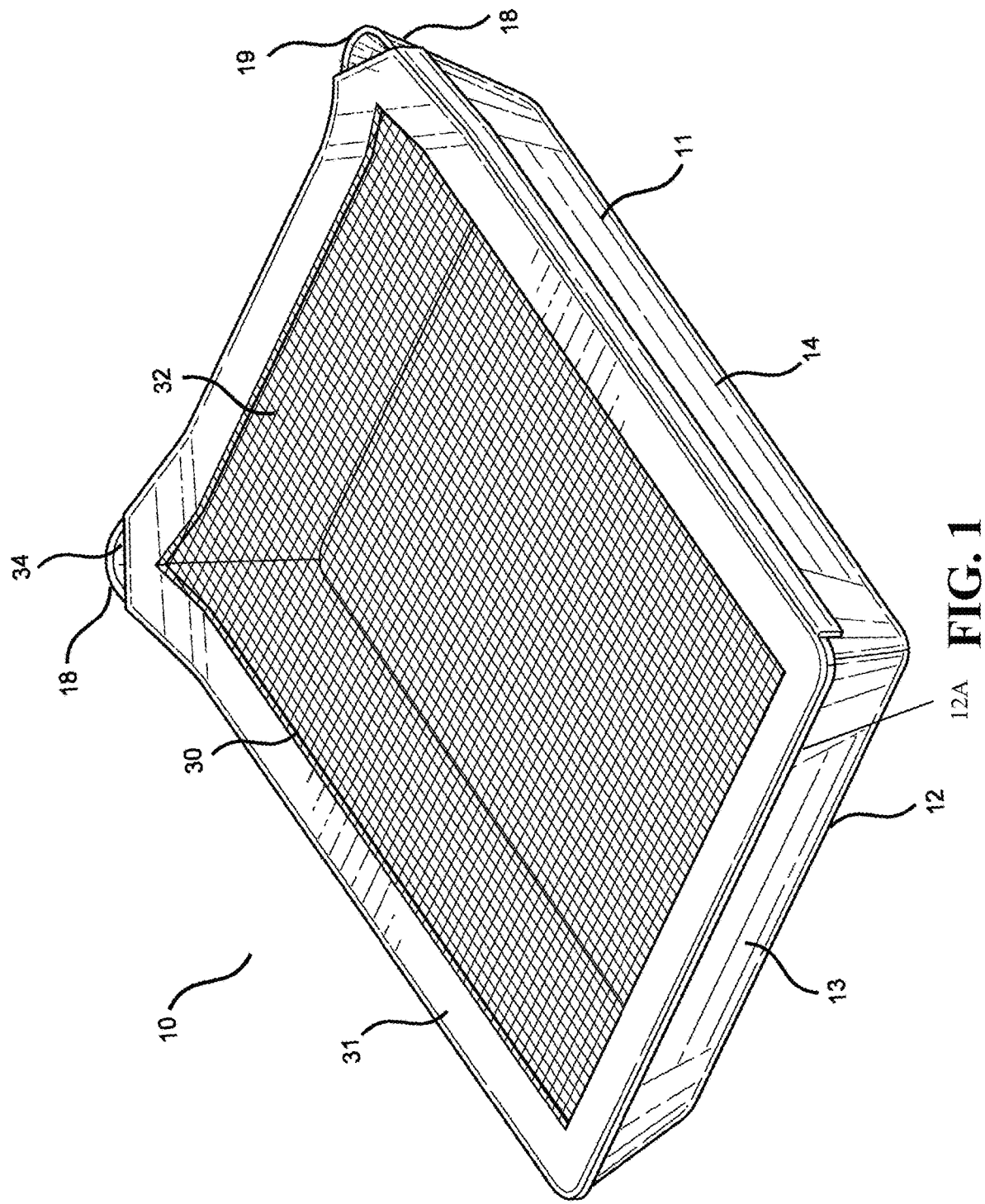
FIG. 1 shows a perspective view of an embodiment of the baking tray assembly with the splatter guard secured to the tray.

Reference is made herein to the attached drawings. Like reference numerals are used throughout the drawings to depict like or similar elements of the baking tray assembly.

For the purposes of presenting a brief and clear description of the present invention, a preferred embodiment will be discussed as used for covering a baking tray with a splatter guard in such a way that liquids can still be effectively drained from the baking tray. As used herein, the term "baking tray" or "tray" is used for exemplary purposes, and the present invention may include any type of cooking vessel having an interior volume capable of supporting food therein, including but not limited to pans, woks, pots, dishes, and the like.

Figure 2:
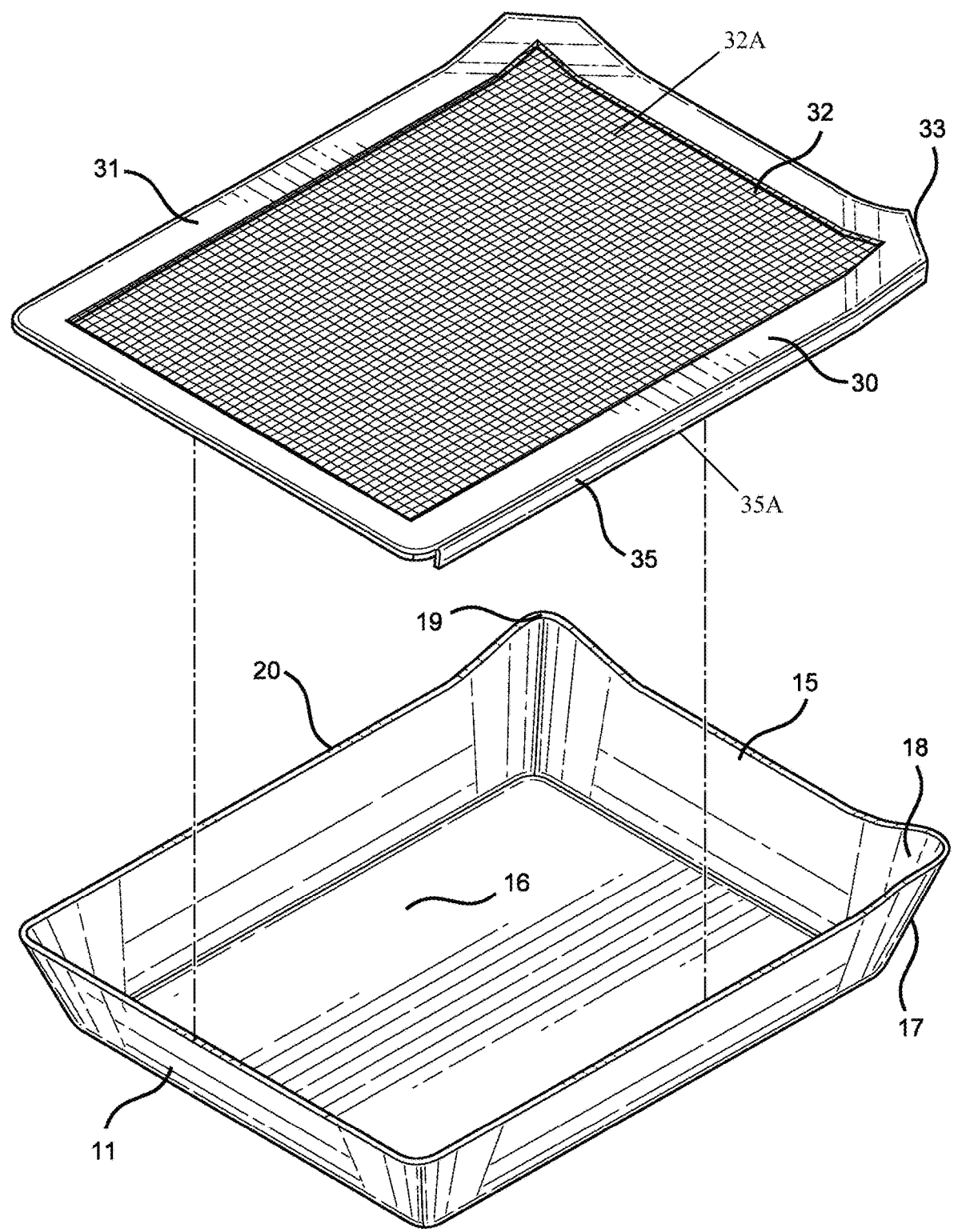
FIG. 2 shows a perspective view of an embodiment of the baking tray assembly with the splatter guard separated from the tray.

Referring now to FIGS. 1 and 2, there is shown a perspective view of an embodiment of the baking tray assembly 10 with a splatter guard 30 secured to a tray 11 and a perspective view of an embodiment of the baking tray assembly 10 with the splatter guard 30 separated from the tray 11, respectively. The baking tray assembly 10 generally includes the tray 11 having a base 12 and a perimeter wall 12A extending upwardly from the base 12, which includes a pair of opposing lateral walls 13 and a pair of opposing longitudinal walls 14 in the shown embodiment. The lateral and longitudinal walls 13,14 define an open upper end 15, such that the tray 11 includes an open interior volume 16. The tray 11 may be made from any suitable materials that are compatible with oven cooking, including but not limited aluminum, steel, ceramics, and the like. While the tray 11 is shown as rectangular, other embodiments may include different shapes.

A splatter guard 30 is removably securable to the tray 11, such that the splatter guard 30 covers the open upper end 15 of the tray 11 when secured thereto. In the shown embodiment, the splatter guard 30 includes a mesh screen 32 supported by a perimeter frame 31. The mesh screen 32 includes mesh openings 32A sized to allow steam to escape but prevent oil and other particles from splatter out from the tray 11. The perimeter frame 31 of the splatter guard 30 is removably securable to the perimeter wall 12A of the tray 11 via any suitable means, including frictional fit or via one or more fasteners 35. For example, a slot 35A on the splatter guard perimeter frame 31 may removably receive the upper perimeter edge of the tray 11 for a frictional fit. In other embodiments, a removably clip, clamp, or similar fastener (all not shown) may be applied to the perimeter frame 31 to secure the splatter guard to the tray 11. In other embodiments, the splatter guard 30 may simply rest atop the tray 11.

At least one pour spout 18 projects upwardly from the perimeter wall 12A of the tray 11. The pour spout 18 allows an individual to easily drain excess liquids from the tray 11 as needed. In the shown embodiment, a corner 17 is defined at each intersection of an endpoint of one of the lateral perimeter walls 13 and one of the longitudinal perimeter walls 14, such that the corner 17 forms a liquid channel for the pour spout 18. A pair of corners 17 include the pour spout 18 so that the tray 11 may be drained from different directions. The tip 19 of the pour spout 18 is positioned above an upper edge 20 of the perimeter walls, which prevents excess material from escaping the tray 11 during the draining process.

In the shown embodiment, the perimeter frame 31 of the splatter guard 30 includes at least one cut-out 33, whereby the at least one small cutout 33 that defines a pour spout opening 34 between the edge of cut-out 33 and the pour spout 18 of the tray 11 when the splatter guard 30 is secured to the tray 11. The pour spout opening 34 allows excess liquid to flow from the tray 11 out of the pour spouts 18 while the splatter guard 30 is still secured to the tray 11, eliminating the need to remove the splatter guard 30 when draining excess liquids. The pour spout openings 34 are sized to allow liquid to flow while keeping a large enough size of the mesh screen 32 to effectively prevent splatter. In the shown embodiment, each corner 17 includes a pour spout 18, and the splatter guard 30 includes cut-outs to define pour spout openings 34 at each corner's pour spout 18. In some embodiments, the mesh screen 32 or splatter guard 30 fits entirely overtop the open upper end of the tray 11, such that the pour spout 18 emerges from underneath the mesh screen 32 or splatter guard 30.

Figure 3:
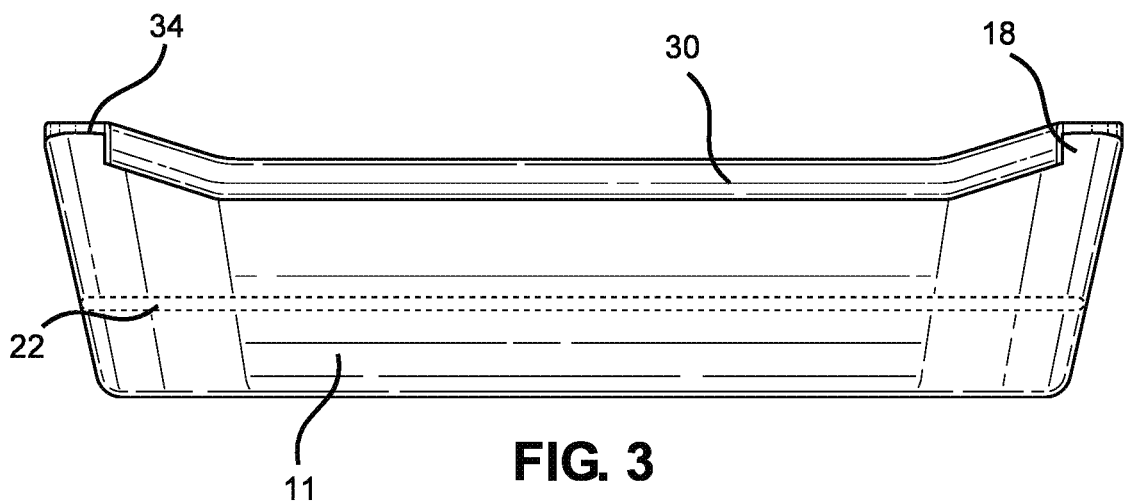
FIG. 3 shows a cross sectional view of an embodiment of the baking tray assembly with the splatter guard secured to the tray.

Referring now to FIG. 3, there is shown a cross sectional view of an embodiment of the baking tray assembly 10 with the splatter guard 30 secured to the tray 11. In some embodiments, the baking tray 11 and the splatter guard 30 may include one or more handles that allows the user to easily grab and maneuver the tray 11 or splatter guard 30. Additionally, the baking tray assembly 10 may further include a removable rack 22 that is supportable within the tray 11. This allows the rack 22 to support a food item while liquids may drain into the bottom of the tray 11. The user may then empty the tray 11 of excess liquid by pouring it out of the pour spout 18. The cut-out area 33 of the splatter guard 30 allows the user to drain liquids without removing the splatter guard 30, while the splatter guard 30 remains in place to prevent splatter and further to help retain the food in the tray 11 as liquids are drained.

In operation, the user may place bacon or other food items within the tray 11. The user may place the bacon on the rack 22 so that excess fat will drip down into the bottom of the tray 11. Placing the bacon on the rack 22 ensures a crispier final product, while placing the bacon directly within the tray results in a chewier final product. Once the bacon is finished cooking, the user may remove the tray 11 from the oven and let cool. In embodiments where the splatter guard 30 completely covers the tray 11, the splatter guard 30 may be removed, along with the rack 22, and the fat may be drained from the pour spout 18. In embodiments that include a small pour spout opening 34, the fat may be drained without removing the mesh screen 32 or splatter guard 30.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention.

The foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:

1. A baking tray assembly, comprising:
   a tray having a base, a pair of opposing lateral perimeter walls extending upwardly from the base, a pair of opposing longitudinal perimeter walls extending upwardly from the base, and an open upper end defining an interior volume;
   wherein a corner is defined at each intersection of an endpoint of one of the lateral perimeter walls and one of the longitudinal perimeter walls;

a splatter guard having a mesh screen supported by a perimeter frame;

wherein the perimeter frame of the splatter guard is removably securable to the perimeter wall of the tray;

wherein the splatter guard is configured to cover the open upper end of the tray;

a pour spout projecting upwardly from each of the two adjacent corners of the perimeter wall of the tray; and a pair of cut-outs disposed on the perimeter frame of the splatter guard, such that a pour spout opening is formed between an edge of each cut-out and one of a plurality of corner spouts when the splatter guard is secured to the tray.

2. The baking tray assembly of claim 1, wherein the splatter guard includes a fastener configured to removably secure the splatter guard to one of the longitudinal perimeter walls and one of the lateral perimeter walls of the tray.

3. The baking tray assembly of claim 2, wherein the fastener includes a slot disposed on the perimeter frame of the splatter guard configured to receive and engage an upper edge of each of the longitudinal and lateral perimeter walls of the tray.

4. The baking tray assembly of claim 2, wherein the fastener is a slot disposed on the splatter guard to removably receive an upper perimeter edge of the tray for a frictional fit.

5. The baking tray assembly of claim 1, wherein the pour spouts extend upwardly above the splatter guard when the splatter guard is secured to the tray.

\* \* \* \* \*